(12) United States Patent
Salay et al.

(10) Patent No.: US 8,055,444 B2
(45) Date of Patent: Nov. 8, 2011

(54) CONTENT DISPLAY AND NAVIGATION INTERFACE

(75) Inventors: Brian Salay, San Francisco, CA (US); Tapan V. Bhat, Mountain View, CA (US); Brian F. Buschmann, Rowley, MA (US); Keara Fallon, San Francisco, CA (US); Hillman Curtis, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 977 days.

(21) Appl. No.: 11/398,396

(22) Filed: Apr. 4, 2006

(65) Prior Publication Data

US 2007/0233377 A1    Oct. 4, 2007

(51) Int. Cl.
*G01C 21/32* (2006.01)

(52) U.S. Cl. ...................................................... 701/211

(58) Field of Classification Search .................. 701/211; 340/1.1, 500, 691.1, 988
See application file for complete search history.

(56) References Cited

U.S. PATENT DOCUMENTS

| | | | |
|---|---|---|---|
| 5,341,293 A | | 8/1994 | Vertelney et al. |
| 5,815,657 A * | | 9/1998 | Williams et al. ................... 705/1 |
| 5,838,319 A | | 11/1998 | Guzak et al. |
| 5,867,163 A | | 2/1999 | Kurtenbach |
| 5,893,717 A * | | 4/1999 | Kirsch et al. ................... 434/118 |
| 5,911,145 A | | 6/1999 | Arora et al. |
| 6,195,694 B1 * | | 2/2001 | Chen et al. ................... 709/220 |
| 6,201,540 B1 | | 3/2001 | Gallup et al. |
| 6,335,737 B1 | | 1/2002 | Grossman et al. |
| 6,344,880 B1 * | | 2/2002 | Takahashi et al. ............ 348/563 |
| 6,466,237 B1 | | 10/2002 | Miyao et al. |
| 6,820,111 B1 * | | 11/2004 | Rubin et al. ................... 709/203 |
| 6,857,010 B1 * | | 2/2005 | Cuijpers et al. ............... 709/219 |
| 6,925,609 B1 | | 8/2005 | Lucke |
| 7,185,290 B2 * | | 2/2007 | Cadiz et al. .................... 715/838 |
| D540,336 S | | 4/2007 | Kim et al. |
| 7,233,973 B2 | | 6/2007 | Melet et al. |
| D550,687 S | | 9/2007 | Cho et al. |
| D555,661 S | | 11/2007 | Kim |
| D567,817 S | | 4/2008 | Kwag et al. |

(Continued)

FOREIGN PATENT DOCUMENTS

JP      2004-021522      1/2004

(Continued)

OTHER PUBLICATIONS

Non-Final Office Action mailed Jun. 25, 2008 for U.S. Appl. No. 11/502,758, filed Aug. 11, 2006, 7 pages.

(Continued)

*Primary Examiner* — John Nguyen
*Assistant Examiner* — Kyung Kim
(74) *Attorney, Agent, or Firm* — James J. DeCarlo; Greenberg Traurig, LLP (57) ABSTRACT

A user interface for navigating and viewing content is described. In one example, the apparatus includes display logic for displaying at least two content properties, wherein each of the content properties is associated with additional content (e.g., an application, service, media object, or combinations thereof). Further, the apparatus includes selection logic for displaying the content associated with the content properties in response to selections thereof, and the content associated with each content property is displayed in a common (or reusable) display space of the interface. As different content properties are selected, the content displayed within the display space is replaced (e.g., through animation) according to the associated content of the newly selected content properties.

21 Claims, 4 Drawing Sheets

U.S. PATENT DOCUMENTS

| | | | |
|---|---|---|---|
| 7,353,462 B2 | 4/2008 | Caffarelli | |
| 7,382,773 B2* | 6/2008 | Schoeneberger et al. | 370/353 |
| 2002/0095462 A1* | 7/2002 | Beck et al. | 709/204 |
| 2003/0146930 A1 | 8/2003 | Schelvis et al. | |
| 2003/0220734 A1* | 11/2003 | Harrison et al. | 701/208 |
| 2004/0034646 A1 | 2/2004 | Kimball et al. | |
| 2004/0141008 A1 | 7/2004 | Jarczyk et al. | |
| 2004/0141508 A1* | 7/2004 | Schoeneberger et al. | 370/401 |
| 2004/0142720 A1 | 7/2004 | Smethers | |
| 2004/0155909 A1 | 8/2004 | Wagner | |
| 2004/0216036 A1 | 10/2004 | Chu et al. | |
| 2004/0233239 A1 | 11/2004 | Lahdesmaki | |
| 2005/0050301 A1* | 3/2005 | Whittle et al. | 712/32 |
| 2005/0188331 A1 | 8/2005 | Shimada et al. | |
| 2005/0231520 A1* | 10/2005 | Forest | 345/581 |
| 2005/0240874 A1 | 10/2005 | Kiesekamp et al. | |
| 2006/0010394 A1 | 1/2006 | Chaudhri et al. | |
| 2006/0053379 A1 | 3/2006 | Henderson et al. | |
| 2006/0069998 A1* | 3/2006 | Artman et al. | 715/721 |
| 2006/0101350 A1 | 5/2006 | Scott | |
| 2006/0161860 A1* | 7/2006 | Holecek et al. | 715/781 |
| 2007/0014278 A1 | 1/2007 | Ebbesen et al. | |
| 2007/0133876 A1 | 6/2007 | Chande et al. | |
| 2007/0157220 A1* | 7/2007 | Cordray et al. | 725/9 |
| 2007/0300187 A1 | 12/2007 | Hama et al. | |
| 2008/0072167 A1 | 3/2008 | Choi et al. | |
| 2008/0086699 A1 | 4/2008 | Antikainen et al. | |

FOREIGN PATENT DOCUMENTS

| | | |
|---|---|---|
| KR | 2003-0055855 | 7/2003 |
| KR | 2005-0080382 | 8/2005 |
| WO | WO 2006017138 | 2/2006 |

OTHER PUBLICATIONS

International Search Report mailed on Jul. 15, 2008, for PCT Application No. PCT/US07/02727, filed on Jan. 31, 2007, three pages.

Written Opinion mailed on Jul. 15, 2008, for PCT Application No. PCT/US07/02727, filed on Jan. 31, 2007, five pages.

Google. (Feb. 2006). "About Gmail—It's Good to Chat" located at <http://web.archive.org//web/web20060209025846/http://mail.google.com/mail/help/chat.html>, last visited on May 19, 2009, five pages.

Nextel Communication, Inc. (Apr. 14, 2005). "Nextel AOL Instant Messenger," one page.

International Search Report mailed Oct. 10, 2007, for PCT Application No. PCT/US2007/008193 filed Mar. 30, 2007, 9 pages.

International Preliminary Report on Patentability mailed on Oct. 8, 2008, for PCT Application No. PCT/US2007/008193, filed on Mar. 30, 2007, five pages.

International Preliminary Report on Patentability mailed on Oct. 14, 2008, for PCT Application No. PCT/US2007/002727, filed on Jan. 31, 2007, six pages.

The Ledger.com. (2008). "AOL Still the Leader by Far When It Comes to Instant Messaging Software," located at <http://www.theledger.com/apps/pbcs.dll/article?AID=/20070211/NEWS/702110319/1001 /...> last visited on Sep. 29, 2008, eight pages.

Supplementary Search Report (EP 07 75 4678) dated Jul. 11, 2011; 2 pages.

* cited by examiner

CONTENT DISPLAY AND NAVIGATION INTERFACE

BACKGROUND

1. Field

The present inventions relate generally to systems and methods for user interfaces, and in one example to a content display and navigation interface operable within an animated browser interface.

2. Related Art

The Internet and other networks interconnect computers and computing devices to allow for easy transport of data over network connections. Commonly computers and computing devices are organized using the client-server model, wherein network connections are established between some computers or computing devices that act as servers and some computers or computing devices that act as clients. Of course, some computers or computing devices can act as servers and clients.

An example of a server is a web server and an example of a client is a web client such as a personal computer running a web browser program. Many different web clients have been developed and variations of web clients are being developed regularly. Merely by way of example, a web client could be embodied in a desktop computer, laptop computer, handheld device, cellular telephone, wireless device, electronic device with embedded web client functionality, or the like. Generally, all that is required of a device is a user interface and a network interface.

Generally, a web client operates according to the interface to issue requests to web servers, using well-known (or other suitable) protocols. In response to requests received, web servers return data responses. In a typical description of web client-server interaction, the HTTP protocol is assumed to be used, wherein the web client issues a request directed at a particular web server address for a page represented by a URL in the request and a server responsive to the particular web server address responds with data that may be a page to be displayed or other data set. Generally, regardless of the actual data being requested and returned, the data returned is referred to as a web page.

A web client that is capable of presenting all or part of a web page in a user interface to a user and accepting user input wherein at least some of the user input can cause the web client to present different and custom web pages and are often referred to as a "Web browser" because of its common use by a user to navigate among web pages generally considered to be part of a "Web" of pages that reference other pages.

Web browsers are known and are in common use and often provide functionality in addition to presenting web pages and accepting user input related to presented web pages. For example, web pages might include program elements that are executed by a web browser upon receipt of a web page including such program elements. One example of such program elements are JAVA® applets.

Web pages also might include program elements that cause a web server to take an action. For example, a web server might provide portal services, wherein the web server collects information from various sources and upon request generates a portal page for a web client. An example of such a portal page is the main Yahoo!® page (www.yahoo.com) and personalized pages provided by My Yahoo!® (my.yahoo.com). The latter provides for pages to be delivered to web clients that are customized based on user preferences stored, e.g., at the server.

Customized web pages and varied layouts often provide a rich user experience, but if the presentation of information and content is difficult to manage or too large to navigate the experience may be less favorable.

BRIEF SUMMARY

According to some aspects of the inventions provided herein, systems and methods for navigating and viewing information on a device (e.g., a computer, personal computer, mobile computer device, and the like) are provided.

In one aspect provided herein, a content navigation interface apparatus for displaying content is described. In one example, the apparatus includes display logic for displaying at least two content properties, wherein each of the content properties is associated with content (e.g., an application, service, media object, or combinations thereof). Further, the apparatus includes selection logic for displaying the content associated with the content properties in response to selections thereof, and the content associated with each content property is displayed in a common (or reusable) display space of the interface.

In one example, as different content properties are selected, the content displayed within the display space is replaced or updated according to the associated content of the newly selected content properties. For example, the selection logic may display first content in the display space in response to a selection of a first content property, and thereafter, the selection logic may display second content in place of the first content in response to a selection of a second content property. In some examples, the selection logic may combine the first and second content in response to selections of the first and second content properties. Further, the content properties and display space may animate or move within the interface as different content properties are selected.

In some example, the interface may further include logic for accessing additional content, e.g., to launch an application or service associated with the displayed content. The interface may further display content in two or more simultaneous levels of detail or sizes, which may be user configurable.

In another aspect, a method for displaying and viewing content is provided. In one example, the method includes displaying a plurality of content properties and a display space, wherein each content property is associated with content, and displaying content associated with a selected content property in the display space in response to being selected. Further, as different content properties are selected, the content displayed within the display space is replaced according to the associated content of the newly selected content properties. Additionally, the position of the content properties and/or display space may be moved (e.g., in a shutter like response) within the interface in response to different selections of content properties.

According to another aspect, a computer program product comprising program code for a user interface is provided. The computer program product may include program code operable for displaying at least two content properties, each of the displayed content properties associated with content, and displaying content associated with the content properties in a display space in response to a selection of one of the displayed content properties In one example, the program code is further operable such that as different content properties are selected, the content displayed within the display space is replaced according to the associated content of the newly selected content properties.

The various aspects and examples of the inventions are better understood upon consideration of the detailed description below in conjunction with the accompanying drawings and claims.

DETAILED DESCRIPTION OF THE INVENTIONS

The following description is presented to enable a person of ordinary skill in the art to make and use the inventions. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

In one aspect and example described herein, a content navigation user interface (or a content navigation interface element) is provided, which may be used for displaying and navigating content on or accessible via a user device. In one example, the user interface displays a plurality of content properties (also referred to as "content channels"), where each of the content properties is associated with additional content such as a service, application, or content. A content property may include an icon, text, or other indicia associated with additional content. The interface further includes a common display space that displays content associated with the content properties in response to selection of one of the content properties. A user may sequentially select different content properties to view associated content in the display space. In other examples, a user may select two (or more) of the content properties and view a combination of the content associated with the two content properties.

According to other aspects and examples, the content may be viewed in varying levels of detail. For example, a user may select from two or more levels of detail or sizes to view content. In an illustrative example, a news content property or channel may include articles viewable at a first level including a headline, a second level including the headline and the first 100 characters of the articles, and a third level including the entire content of the articles. In this fashion a user may quickly navigate and access content at the level of detail desired for different types of content. Further, a user may set various levels for various content types for future viewing.

Figure 1:
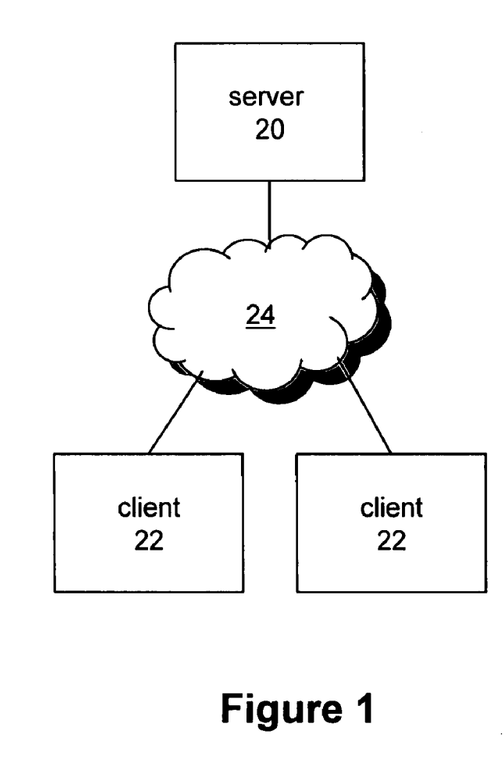
FIG. 1 illustrates an exemplary environment in which exemplary devices, systems, and methods described may be used.

Initially, and with reference to FIG. 1, an exemplary environment in which certain aspects and examples of the user interface and methods described may operate. Generally, one or more clients 22 may access a server 20. The server 20 and clients 22 may include any one of various types of computer devices, having, e.g., a processing unit, a memory (including a permanent storage device), and a communication interface, as well as other conventional computer components (e.g., input device, such as a keyboard and mouse, output device, such as display). For example, client computer 22 may include a desktop computer, laptop computer, mobile device such as a mobile phone, web-enabled phone, smart phone, television, television set-top box, and the like.

Clients 22 and server 20 may communicate, e.g., via suitable communication interfaces via a network 24, such as the Internet. Clients 22 and server 20 may communicate, in part or in whole, via wireless or hardwired communications, such as Ethernet, IEEE 802.11b wireless, or the like. Additionally, communication between clients 22 and server 20 may include various servers such as a mail server, mobile server, and the like.

The server 20 includes logic or is programmed to format data, accessed from local or remote databases or other sources of data, for presentation to users of clients 22, preferably in the format discussed in detail below. The server 20 may utilize various web data interface techniques such as Common Gateway Interface (CGI) protocol and associated applications (or "scripts"), Java® "servlets", i.e., Java® applications running on a web server, or the like to present information and receive input from clients 22. The server 20, although described herein in the singular, may actually comprise plural computers, devices, associated backends, and the like, communicating (wired and/or wireless) and cooperating to perform some or all of the functions described herein.

Server 20 may include or communicate with account servers (e.g., email servers), mobile servers, and the like. It is noted that an account server, accessible by a client 22, may include one or more of a personal email account on an email server (e.g., Yahoo!® Mail), a family photo album account on a photo server (e.g., Yahoo!® Photos), a Personal Information Management (PIM) account on a PIM server (e.g., Yahoo!® Address book or Yahoo!® Notepad), a music library account on a multimedia library server (e.g., Yahoo!® Music), combinations thereof, and the like.

It will be understood by those of ordinary skill in the art that not all the components described may be required, and variations in the arrangement and type of the components may be made without departing from the spirit and scope of the inventions.

Figure 2:
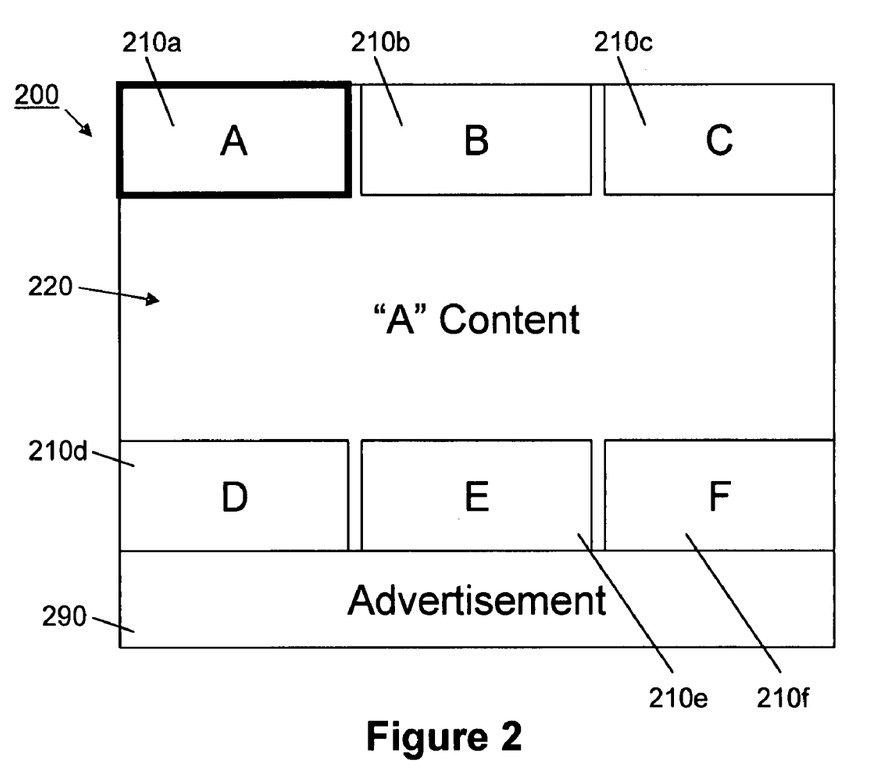
FIG. 2 illustrates an exemplary user interface for displaying and navigating content.

FIG. 2 illustrates an exemplary user interface 200 for displaying and navigating content. Broadly speaking, user interface 200 includes logic for displaying a plurality of content properties 210a-210f and a display space 220. Each content property 210a-210f has content associated therewith, which may include services, applications, and/or content. Content properties 210a-210f may also be referred to as channels or buttons for selecting associated content.

Content properties 210a-210f may be associated with various services, applications, and content such as a web browser, email service or program, instant messenger service, photos (e.g., Yahoo!® Photos), weather, news, media objects, search, maps, local, sports, finance, entertainment, PIM applications, and the like stored locally or remotely. Further, media objects may include documents, articles, photos, audio files, video files, and the like. Additionally, the content may include selections or links to further content accessible by the interface and associated user device, e.g., via Application Programming Interfaces (APIs), web pages, and the like stored or accessed locally or remotely.

Display space 220 generally includes a window or pane for displaying content associated with content properties 210a-210f when selected (e.g., a top row of three content properties 210a-210c, a middle display space 220, and a bottom row of three content properties 210d-210f). In this example, content property "A" is selected (e.g., by a user or by default when the user interface 200 is initiated) and content associated therewith is shown in display space 220. As described in greater detail below, as different content properties 210a-210f are selected, display space 220 is altered or updated to display content associated with the newly selected content property. Accordingly, display space 220 is referred to as "common" or "reusable" space, e.g., the area is used by all of the content properties 210a-210f to display content or previews of content properties 210a-210f.

Content properties 210a-210f may be selected via an input device of a client such as a keyboard or mouse, e.g., clicking or keying a particular content property 210a-210f. In one example, individual content properties 210a-210f are selected by positioning a pointer (e.g., an arrow or other graphic associated with a user device) over the content properties 210a-210f, and without requiring further input, e.g., clicking a mouse. A user may therefore move a pointer over different properties 210a-210f to view previews and content associated with each.

A user may access content associated with content properties 210a-210f by selecting individual content properties (e.g., by highlighting or otherwise selecting one of the content properties 210a-210f). In one example, a content property 210a-210f is selected and content associated therewith displayed in display space 220 when a pointer is over the content property 210a-210f. In other examples, the selection is made when the pointer is over the preview content property 210a-210f and additional input is made (e.g., hitting a key or mouse button). In other examples selections are made via drag-and-drop operations.

It should be understood that content properties 210a-210f may be highlighted or marked in various fashions, e.g., bolded, enlarged, colored more vividly, varying background or border, or the like. In other examples, an indicator, such as an arrow or slider, may be positioned adjacent a content property to indicate its status. In other examples, a selected content property 210a-210f is not highlighted; however, content displayed in display space 220 will make the selection of a particular content property 210a-210f apparent. Additionally, the interface may cycle through additional content options.

Content properties 210a-210f may include any user-identifiable indicia displayed within user interface 200. For example, icons and/or text may be used. Additionally, the display of the content property (e.g., including icons and/or text) may be user configurable or configured by the device/application. For example, user interface 200 may be initially populated with default content properties and content property images, such as an icon for mail, instant messenger, maps, and the like. In other examples, a user may add or configure icons (e.g., by downloading from a server or uploading from another device). For example, a user may add an icon and/or text associated with a particular website, application, etc. Additionally, the appearance of individual content properties 210a-210f may be changed or altered by the user, e.g., to include a photo image, emoticon, text, and the like.

In these examples, content properties 210a-210f are illustrated horizontally above and below display space 220, however, other arrangements are possible. For example, content properties 210a-210f may be displayed on one side of display space 220. In other examples, similar vertical arrangements of content properties 210a-210f may be used on one or both sides of display space 220. Additionally, in yet other examples, content properties may be arranged both vertically and horizontally, at corners of a user interface around a rectangular display space, circularly around a circular display space, and the like. Further, any plurality of content properties 210a-210f displayed within user interface are contemplated.

Additionally, an advertisement 290 is illustrated, which may be included with interface 200 as shown, embedded within display space 220, or otherwise associated with user interface 200 (e.g., as a separate window). The selection of advertisement 290 may be based on various factors, including, but not limited to, user profile information, user history information (e.g., search or viewing history of a user), the display of content properties 210a-210f in user interface 200, a content property that has been selected, combinations thereof, and the like. Further, it should be understood that advertisement 290 may change over time, e.g., in response to user inputs and manipulation of interface 200.

In one example, user interface 200, whether as a stand alone interface or an element of a larger interface or web browser page, may be accessible by a user via an online account such as an email account. For example, a user may login to an account server, and user interface 200 may be included in a "home" page or otherwise displayed in response to a user login. Further, the user interface 200 may include or be part of one or more widgets. In these and other fashions, an individual user may access user interface 200 from multiple client devices; for example, user interface 200 may be served from a computer server to a user accessing the server from various devices such as a personal computer, work computer, mobile computer device such as a phone, and the like. In other examples, of course, user interface 200 may be included as an application program running on a computer device.

Figure 3A:
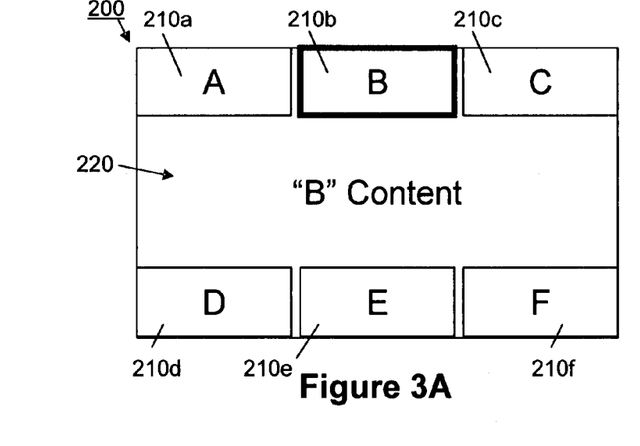
FIGS. 3A-3D illustrate exemplary features and operation of a user interface for navigating and accessing content.
Figure 3B:
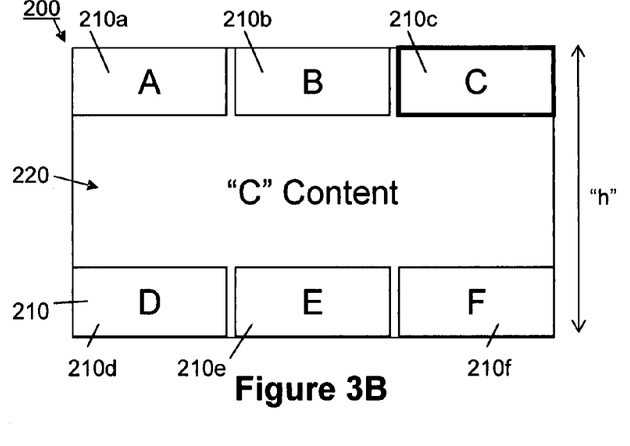

FIGS. 3A-3D illustrate an exemplary operation and additional aspects of user interface 200. In particular, FIGS. 3A and 3B illustrate selections of content property 210b (e.g., "B") and content property 210c (e.g., "C") respectively, resulting in display space 220 displaying content associated therewith. Accordingly, the reusable space of display space 220 replaces "B" content with "C" content in response to a user selection of different channels of content (i.e., content properties 210a-210f).

Figure 3C:
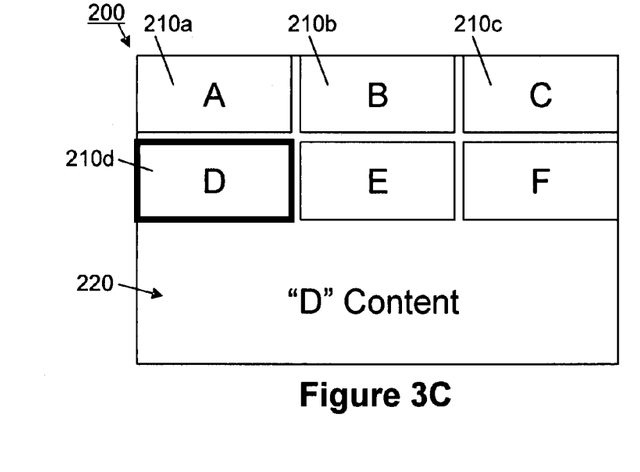
Figure 3D:
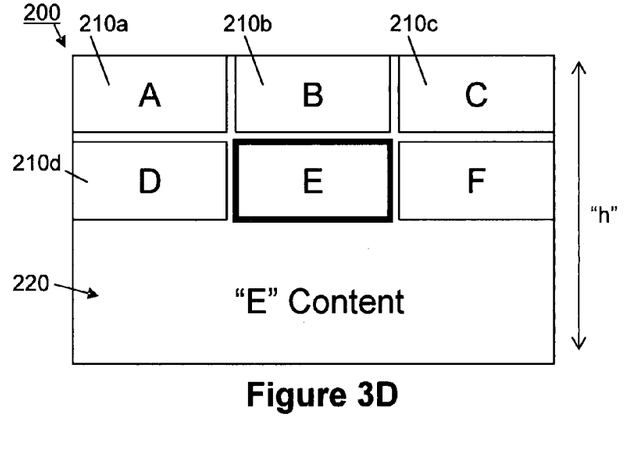

Further, and in one example, in response to a user selecting content property 210d (e.g., "D") as illustrated in FIG. 3C, the lower row of content properties 210d-f (i.e., "D" through "F") moves up (e.g., in a shutter like response) and adjacent to the upper row of content properties 210a-c (i.e., "A" through "C"). Further, display space 220 moves down to the lower portion of user interface 200. In one example, the overall size of, and in particular, the height "h" of user interface 200 remains unchanged. This may be advantageous, for example, if user interface 200 is incorporated as an element within a larger display, such as a browser window.

In other examples, the upper row of content properties 210a-210c could move down and adjacent the lower row of content properties 210d-210f in a similar fashion. In yet other examples, user interface 200 may include a third row of content properties, the content properties 210d-f and display space 220 moving similar to the row of content properties 210d-f as described above to display associated content when selected.

Figure 4A:
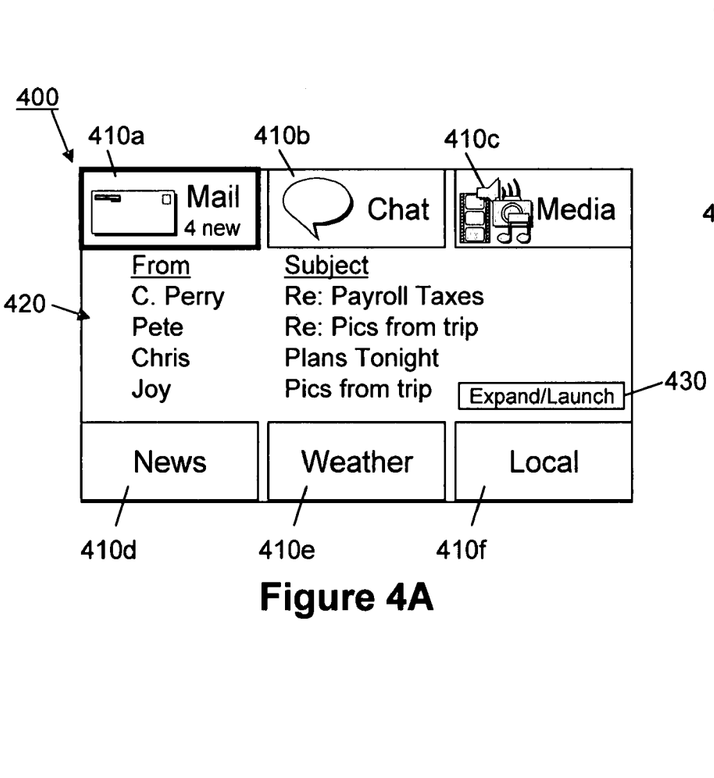
FIGS. 4A and 4B illustrate exemplary features and operation of a user interface for navigating and accessing content.
Figure 4B:
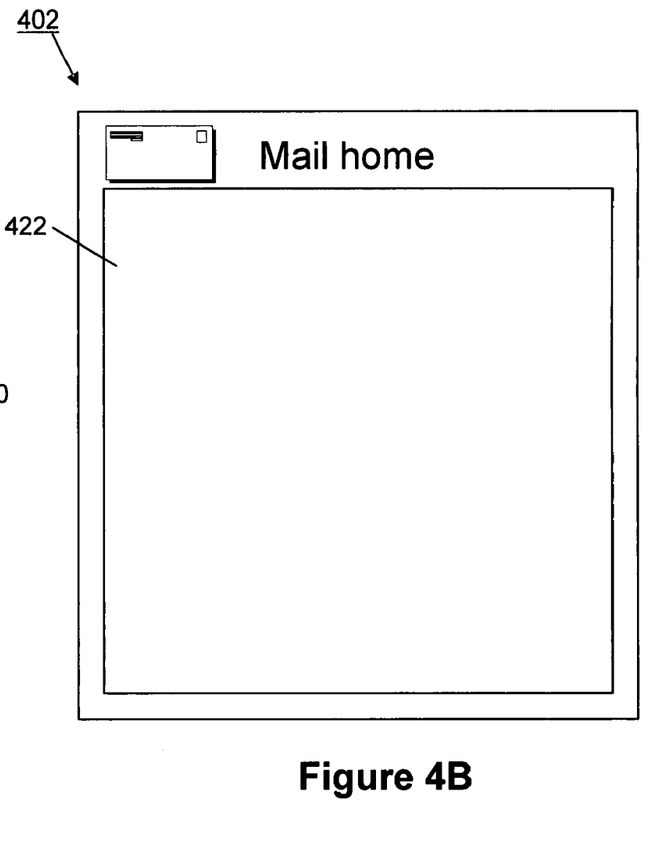

FIGS. 4A and 4B illustrate an exemplary operation and aspects of user interface 400 (which may be similar or dissimilar to user interface 200 shown in FIGS. 2 and 3A-3D). As described above, display space 420 displays content associated with the particular content channel or content property 410a-410f selected. Further, in this example, a launch/expand selection 430 is included within display space 420 (or otherwise associated with user interface 400), which is operable to provide the user with additional content and/or functionality. For example, interface 400 may include logic for launching or expanding the content of display space 420 in response to selection of expand/launch 430. In one example, user interface 400 and/or display space 420 may be expanded to a larger display size with preview to include additional content. In other examples, a new window or page may be launched for the display of content as shown, e.g., in FIG. 4B.

In this illustrative example, content property 410a corresponds to an electronic mail program (e.g., Yahoo!® mail, Hotmail®, or the like). In response to selection of content property 410a, display space 420 shows additional content, e.g., a preview of new emails including the identity of the sender, and the subject line. In other examples, display space 420 may include more content than display 420 allows, and include a scroll bar to view additional content that does not fit within display space 420.

A user may access individual emails directly through display space 420, e.g., by selecting the displayed emails within display space 420. Selecting a displayed email may cause an access to the individual email within display space 420 or new window or pane 402 (e.g., as shown in FIG. 4B). Additionally, the user may expand the content via launch/expand selector 430 (or equivalent) to access pane 402 having additional functionality and content 422 associated with the particular mail program.

In other illustrative examples shown in FIG. 4A, content property 410b corresponds to a messenger service. When content property 410b is selected, display space 420 may display the status of contacts (e.g., if friends are online, etc.), conversations, and so on. A user may select one of the displayed contacts to initiate an instant messaging session and/or launch the messenger service. Additionally, an expand option (similar to expand/launch 430) may be displayed within display space 420 for launching or opening the associated messenger program (without selecting a particular displayed contact etc.).

Additionally, other content properties corresponding to services or applications such as music, weather, news, local, maps, etc., may display selected content in display space 420. The selected content properties 410a-410f may be user selected or based on user profiles, user history, user input (e.g., bookmarks, favorites, etc.). Additionally, in systems that may display varying levels of detail of content (e.g., from very broad to very specific or from small to large), the level of detail of content displayed in response to selections of content properties 410a-410f may be user selected as described, via user input, profile, history, and the like.

Figure 5:
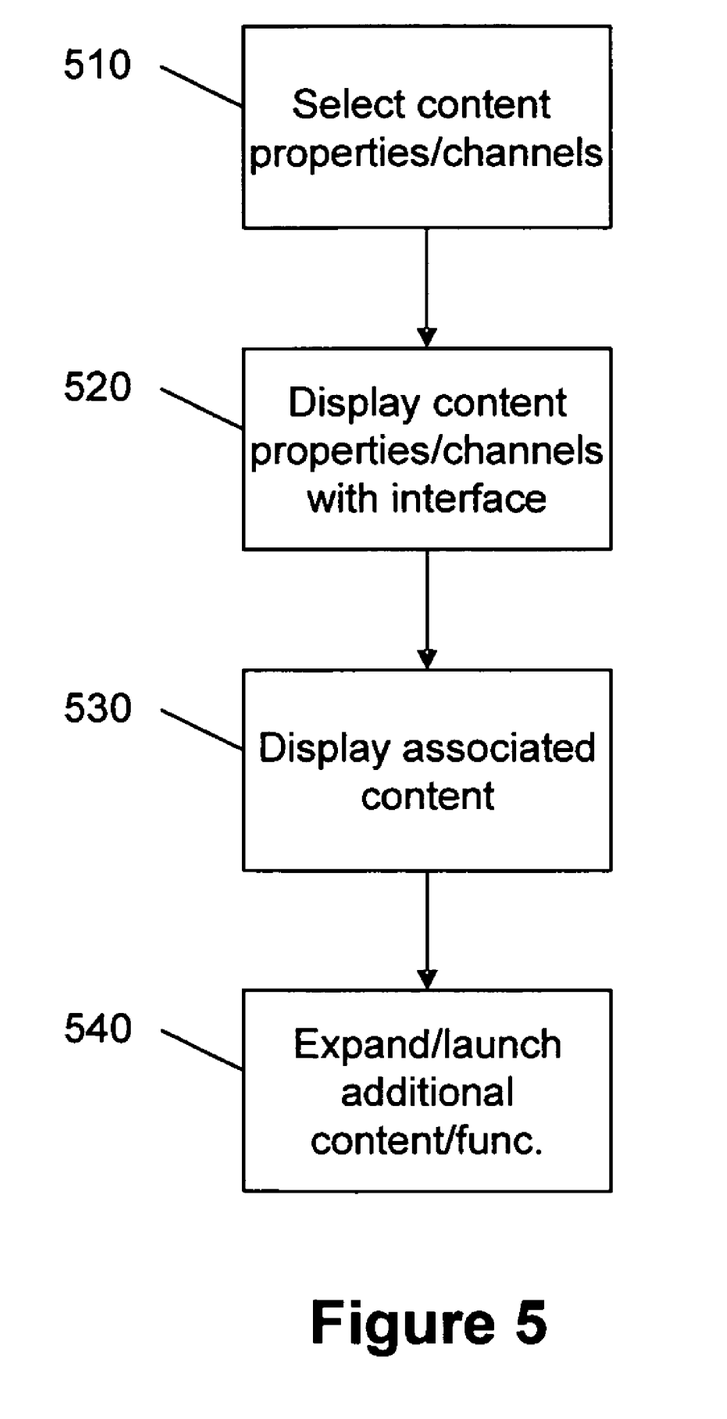
FIG. 5 illustrates an exemplary method for navigating and displaying content via a user interface.

FIG. 5 illustrates an exemplary method for displaying and navigating content via a user interface displayed on a device. The interface may be similar or different to those described herein. Initially, a selection of content properties or content channels for display is selected at 510. For example, a user operating a suitable device may access and select from one or more content properties available or accessible via the device and assign them for inclusion with the user interface. In other examples, content properties may initially be selected and assigned by default, in response to user profiles, history data, and the like. The selection and assigning may be made by a user using a selection tool, text based search, or the like.

The assigned content properties are displayed within a user interface at 520. In one example, the content properties are displayed adjacent a display space, operable for displaying content associated with the content property. As described, the content properties may be displayed in one of a variety of user-selected varying sizes. Further, a user may select different levels of detail for the display of the content properties.

Content and/or functionality associated with a content property is displayed in the display space in response to a user selection at 530. The content displayed is generally of a greater level of detail than the level of detail of the content property. A user may select different content properties and reuse the display space to view different associated content therein. Further, in response to some selections of the content properties, the content properties may move or shift within the display.

Additional content and/or functionality associated with the content property and displayed content may be accessed or viewed at 540. For example, by selecting the content in the display space (or otherwise selecting) additional content and/or functionality may become available either in the original display space or a new window or display. Additionally, in some examples, a user may select two or more content properties to be commonly displayed. The content associated therewith may be combined in various fashions, including, e.g., layering within a common window, interleaving content, or creating new content associated characteristics of each of the original content properties and associated content.

The various aspects and examples of the inventions can be implemented in any suitable form including hardware, software, firmware or any combination of these. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computing device comprising:
a processor;
a storage medium for tangibly storing thereon program logic for execution by the processor, the program logic comprising:
display logic executed by the processor for simultaneously displaying a plurality of content properties and a common display space on an interface tangibly displayed on a display device, such that each content property of the plurality of content properties is associated with respective content;
selection logic executed by the processor for displaying the respective content associated with each content property of the plurality of content properties in response to selections thereof, such that the respective content associated with each content property of the plurality of content properties is displayed in the common display space at a respective level of detail of a plurality of levels of detail in response to the selection of the respective content property, where the respective level of detail is determined by a user profile, and such that a first content property of the plurality of content properties is positioned above the common display space, and a second content property of the plurality of content properties is positioned below the common display space, such that the common display space and the second content property of the plurality of content properties are moved in response to user interaction with the second content property of the plurality of content properties such that the second one of the plurality of content properties is positioned above the common display space.

2. The computing device of claim 1, wherein the content displayed in the display space is replaced according to selections of different content properties.

3. The computing device of claim 1, wherein the selection logic replaces the respective content associated with the second content property of the plurality of content properties displayed in the common display space with second the respective content associated with the first content property of the of the plurality of content properties in response to a selection of the first content property of the of the plurality of content properties.

4. The computing device of claim 1, wherein the second content property of the plurality of content properties is selected in response to a pointer positioned over the second content property.

5. The computing device of claim 1, further comprising logic executed by the processor for initiating the launch of an application associated with content displayed in the display space in response to user input.

6. The computing device of claim 1, further comprising logic executed by the processor for accessing the content within the display space.

7. The computing device of claim 1, further comprising logic executed by the processor for initiating the display of additional content associated with content displayed in the display space in response to user input.

8. The computing device of claim 1, further comprising logic executed by the processor for determining the plurality of content properties for display within the interface in response to user input.

9. The computing device of claim 1, wherein the content comprises an application or service.

10. The computing device of claim 1, wherein the content comprises a media object.

11. A method comprising:
simultaneously displaying, using a computing device, a plurality of content properties and a common display space on an interface tangibly displayed on a display device, such that each content property of the plurality of content properties is associated with respective content, and such that a first content property of the plurality of content properties is positioned above the common display space, and a second content property of the plurality of content properties is positioned below the common display space;
in response to a selection of the second content property of the plurality of content properties by a user:
displaying, using the computing device, the respective content associated with the second content property of the plurality of content properties in the common display space such that the respective content is displayed at a level of detail of a plurality of levels of detail, where the respective level of detail is determined by a profile for the user; and
moving, using the computing device, the common display space and the second content property of the plurality of content properties such that the second one of the plurality of content properties is positioned above the common display space.

12. The method of claim 11, wherein
the second content property of the plurality of content properties is selected in response to a pointer positioned over the second content property.

13. The method of claim 11, further comprising:
replacing, using the computing device, the respective content associated with the second content property of the plurality of content properties displayed in the common display space with the respective content associated with the first content property of the plurality of content properties in response to a selection of the first content property of the plurality of content properties.

14. The method of claim 11, further comprising:
accessing, using the computing device, additional content associated with the content displayed in the display space.

15. The method of claim 11, wherein the content is selected from the group consisting of an application, service, and media object.

16. A computer readable storage media for tangibly storing thereon computer readable instructions for a method comprising:
simultaneously displaying a plurality of content properties and a common display space on an interface, such that each content property of the plurality of content properties is associated with respective content, and such that a first content property of the plurality of content properties is positioned above the common display space and a second content property of the plurality of content properties is positioned below the common display space;
in response to a selection of the second content property of the plurality of content properties by a user:
displaying the respective content associated with the second content property of the plurality of content properties in the common display space such that the respective content is displayed at a level of detail of a plurality of levels of detail, where the respective level of detail is determined by a profile for the user; and
moving the common display space and the second content property of the plurality of content properties such that the second one of the plurality of content properties is positioned above the common display space.

17. The computer readable storage media of claim 16, further comprising:
replacing the respective content associated with the second content property of the plurality of content properties displayed in the common display space with the respective content associated with the first content property of the plurality of content properties in response to a selection of the first content property of the plurality of content properties.

18. The computer readable storage media of claim 16 wherein the second content property of the plurality of content properties is selected in response to a pointer positioned over the second content property.

19. The computer readable storage media of claim 16, further comprising:
initiating the launch of an application associated with content displayed in the display space in response to input from the user.

20. The computer readable storage media of claim 16, further comprising:
initiating the display of additional content associated with content displayed in the display space in response to input from the user.

21. The computer readable storage media of claim 16, wherein the content is selected from the group consisting of an application, service, and media object.

* * * * *